(12) United States Patent
Park et al.

(10) Patent No.: US 12,258,271 B2
(45) Date of Patent: Mar. 25, 2025

(54) HYDROGEN COMPRESSION SYSTEM

(71) Applicants: HYUNDAI MOTOR COMPANY, Seoul (KR); KIA CORPORATION, Seoul (KR)

(72) Inventors: Ji Hye Park, Seoul (KR); Ji Sung Lee, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 366 days.

(21) Appl. No.: 17/852,984

(22) Filed: Jun. 29, 2022

(65) Prior Publication Data
US 2023/0271826 A1 Aug. 31, 2023

(30) Foreign Application Priority Data

Feb. 28, 2022 (KR) .................. 10-2022-0026075

(51) Int. Cl.
*F17C 11/00* (2006.01)
*C01B 3/00* (2006.01)

(52) U.S. Cl.
CPC .......... *C01B 3/0057* (2013.01); *C01B 3/0031* (2013.01); *C01B 3/0036* (2013.01); *F17C 11/005* (2013.01)

(58) Field of Classification Search
CPC ....... C01B 3/0057; Y02E 60/32; F17C 11/005
See application file for complete search history.

(56) References Cited

U.S. PATENT DOCUMENTS

| | | | | |
|---|---|---|---|---|
| 5,393,616 A | * | 2/1995 | Mori | H01M 4/383 429/223 |
| 7,776,258 B2 | * | 8/2010 | Kohno | C22C 30/04 420/580 |
| 8,052,784 B2 | * | 11/2011 | Field | C01B 3/0005 423/658.2 |
| 9,079,144 B2 | * | 7/2015 | Barton | H01M 8/04208 |
| 9,211,683 B2 | * | 12/2015 | Emori | B29D 22/003 |

(Continued)

FOREIGN PATENT DOCUMENTS

| | | | |
|---|---|---|---|
| KR | 2013-0007032 A | 1/2013 | |
| KR | 10-1806685 B1 | 12/2017 | |
| WO | WO-2021100784 A1 * | 5/2021 | ............. C01B 3/001 |

OTHER PUBLICATIONS

Description Translation (Year: 2021).*

*Primary Examiner* — Filip Zec
(74) *Attorney, Agent, or Firm* — MCDONNELL BOEHNEN HULBERT & BERGHOFF LLP

(57) ABSTRACT

A hydrogen compression system includes an inner container made of a non-magnetic element and having a hydrogen inlet/outlet portion through which hydrogen flows in or out of the inner container, a metal hydride material accommodated in the inner container, an outer container configured to surround the inner container and having an inlet/outlet port through which hydrogen flows in or out of the outer container, and an induction heating unit disposed between the inner container and the outer container and configured to heat the metal hydride material by induction heating, thereby obtaining an advantageous effect of simplifying a structure and process for heating the metal hydride material and quickly heating the metal hydride material to an accurate temperature.

11 Claims, 3 Drawing Sheets

(56) References Cited

U.S. PATENT DOCUMENTS

| | | | | |
|---|---|---|---|---|
| 9,844,765 B2* | 12/2017 | Barton | .................. | C01B 3/0084 |
| 10,087,896 B1* | 10/2018 | Perez | ..................... | F02D 41/26 |
| 10,221,816 B2* | 3/2019 | Perez | ..................... | B60K 6/24 |
| 10,267,458 B2* | 4/2019 | Eriksen | ................ | F17C 11/005 |
| 10,507,452 B2* | 12/2019 | Murph | .............. | B01J 20/28007 |
| 11,506,343 B2* | 11/2022 | Lee | .................. | H01M 8/04089 |
| 11,946,597 B2* | 4/2024 | Park | ......................... | F17C 3/00 |
| 12,066,151 B2* | 8/2024 | Park | ..................... | C01B 3/0068 |
| 2008/0038617 A1* | 2/2008 | McLean | ............... | C01B 3/0005 |
| | | | | 429/510 |
| 2008/0250804 A1* | 10/2008 | Kubo | ..................... | F17C 5/007 |
| | | | | 165/44 |
| 2008/0280180 A1* | 11/2008 | Correa | ............... | H01M 8/0254 |
| | | | | 429/479 |
| 2010/0108543 A1* | 5/2010 | Tokiwa | ................ | F17C 11/005 |
| | | | | 502/402 |
| 2011/0000798 A1* | 1/2011 | Ornath | ................ | F17C 11/005 |
| | | | | 419/10 |
| 2011/0033342 A1* | 2/2011 | Horiguchi | ............ | H01M 8/065 |
| | | | | 422/119 |
| 2011/0220638 A1* | 9/2011 | Wei | ......................... | H05B 3/50 |
| | | | | 219/550 |
| 2012/0052353 A1* | 3/2012 | Sugii | .................... | H01M 4/383 |
| | | | | 429/94 |
| 2014/0044605 A1* | 2/2014 | Langan | .................... | C01B 3/04 |
| | | | | 422/198 |
| 2014/0261864 A1* | 9/2014 | Cohen | ...................... | F17C 5/06 |
| | | | | 141/4 |
| 2018/0222751 A1* | 8/2018 | Autrusson | ............. | C01B 3/0005 |
| 2019/0257551 A1* | 8/2019 | Iwamura | ................ | F17C 11/00 |
| 2021/0180752 A1 | 6/2021 | Lee et al. | | |
| 2023/0003461 A1* | 1/2023 | Kobayashi | ............ | F28D 20/003 |
| 2024/0263747 A1* | 8/2024 | Schmied | ............... | F17C 11/005 |

* cited by examiner

HYDROGEN COMPRESSION SYSTEM

CROSS REFERENCE TO RELATED APPLICATIONS

This application claims priority to and the benefit of Korean Patent Application No. 10-2022-0026075 filed in the Korean Intellectual Property Office on Feb. 28, 2022, the entire contents of which are incorporated herein by reference.

TECHNICAL FIELD

The present disclosure relates to a hydrogen compression system, and more particularly, to a hydrogen compression system capable of compressing hydrogen into high-pressure hydrogen by controlling a temperature of a metal hydride material.

BACKGROUND

Hydrogen may be produced by hydrogen production facilities using steam reforming, water electrolysis, coal gasification, biomass gasification, and other fossil fuel-based methods such as a thermochemical process.

Meanwhile, because hydrogen extracted (produced) in the hydrogen production facility has a low pressure, it is difficult to store the hydrogen in a high-pressure storage facility such as a high-pressure tank. Therefore, hydrogen extracted (produced) in the hydrogen production facility needs to be compressed by a separate compression facility.

As methods of compressing hydrogen, there are a method of compressing hydrogen in a mechanical manner and a method of compressing hydrogen in a non-mechanical manner. As a compression facility that compresses hydrogen in a non-mechanical manner, there has been proposed in the related art a facility that compresses hydrogen using a metal hydride-based thermochemical compressor.

Unlike a mechanical compressor (e.g., a reciprocating compressor), the thermochemical compressor may compress hydrogen without a separate mechanical component (e.g., a piston configured to reciprocate). Therefore, it is possible to simplify the structure of the compressor and improve a degree of design freedom and spatial utilization.

The thermochemical compressor may compress hydrogen through a process of repeatedly heating and cooling a metal hydride material by using characteristics of the metal hydride material.

However, in the related art, a separate heat source needs to be provided to heat the metal hydride material, and the metal hydride material needs to be heated by heat transferred from the heat source to the metal hydride material. For this reason, there is a problem in that energy efficiency deteriorates because of a thermal loss that occurs during a process of transferring heat from the heat source to the metal hydride material. Further, there is also a problem in that it is difficult to quickly heat the metal hydride material to an accurate temperature.

SUMMARY

The present disclosure has been made in an effort to minimize an increase in power consumption caused by thermal loss and improve energy efficiency.

The present disclosure has also been made in an effort to quickly heat a metal hydride material to an accurate temperature to compress hydrogen.

In particular, the present disclosure has been made in an effort to quickly and accurately heat a metal hydride material without providing a separate heat source for heating the metal hydride material.

The present disclosure has also been made in an effort to improve performance in compressing hydrogen and shorten the time required for a process of compressing hydrogen.

The present disclosure has also been made in an effort to improve durability and safety.

The present disclosure has also been made in an effort to simplify a structure and improve a degree of design freedom and spatial utilization.

The objects to be achieved by the embodiments are not limited to the above-mentioned objects, but also include objects or effects that may be understood from the solutions or embodiments described below.

An exemplary embodiment of the present disclosure provides a hydrogen compression system including an inner container made of a non-magnetic element and having a hydrogen inlet/outlet portion through which hydrogen flows in or out of the inner container, a metal hydride material accommodated in the inner container, an outer container configured to surround the inner container and having an inlet/outlet port through which hydrogen flows in or out of the outer container, and an induction heating unit disposed between the inner container and the outer container and configured to heat the metal hydride material by induction heating.

This is to simplify a structure and process for heating the metal hydride material and quickly heat the metal hydride material to an accurate temperature.

That is, in the related art, a separate heat source needs to be provided to heat the metal hydride material, and the metal hydride material needs to be heated by heat transferred from the heat source to the metal hydride material. For this reason, there is a problem in that energy efficiency deteriorates because of a thermal loss that occurs during a process of transferring heat from the heat source to the metal hydride material. Further, there is also a problem in that it is difficult to quickly heat the metal hydride material to an accurate temperature.

In contrast, according to the embodiment of the present disclosure, the induction heating unit is disposed between the inner container and the outer container, and the metal hydride material is heated by induction heating by the induction heating unit. Therefore, it is possible to quickly heat the metal hydride material to an accurate temperature.

Among other things, according to the embodiment of the present disclosure, the metal hydride material is not indirectly heated (e.g., heated by thermal conduction), but the metal hydride material itself is directly heated (by induction heating). Therefore, it is possible to obtain an advantageous effect of shortening the time required to heat the metal hydride material and entirely heating the metal hydride material at a uniform temperature.

In addition, according to the embodiment of the present disclosure, the inner container is not directly heated, but the metal hydride material accommodated in the inner container is heated by induction heating. Therefore, it is possible to obtain an advantageous effect of minimizing degradation of the inner container and improving the durability and stability.

In addition, according to the embodiment of the present disclosure, the inner container configured to accommodate the metal hydride material is made of a non-magnetic element, and thus a decrease in intensity of the induced magnetic field caused by the inner container may be minimized. Therefore, it is possible to obtain an advantageous effect of stably ensuring induction heating performance of the metal hydride material and further shortening the time required to heat the metal hydride material.

The inner container may have various structures having the hydrogen inlet/outlet portion and capable of accommodating the metal hydride material therein.

According to the exemplary embodiment of the present disclosure, the inner container may include a container main body having an accommodation space for accommodating the metal hydride material, and a container cover configured to cover the accommodation space. The hydrogen inlet/outlet portion may be defined as a gap between the container main body and the container cover.

According to the exemplary embodiment of the present disclosure, the metal hydride material may include at least any one of an AB5-based alloy, an AB2-based alloy, and an AB-based alloy.

Various induction heating elements capable of heating the metal hydride material by induction heating may be used as the induction heating unit.

According to the exemplary embodiment of the present disclosure, the induction heating unit may include an induction heating coil configured to apply an induced magnetic field to the metal hydride material.

For example, the induction heating coil may be disposed between the inner container and the outer container and correspond to a bottom surface of the inner container.

As another example, an induction heating coil may have a helical (spiral) shape that surrounds the lateral periphery of the inner container.

According to another embodiment of the present disclosure, a part of the induction heating coil may be formed to correspond to the bottom surface of the inner container, and another part of the induction heating coil may be formed to surround the lateral periphery of the inner container.

According to the exemplary embodiment of the present disclosure, the hydrogen compression system may include a filter member disposed in the inner container and configured to cover the metal hydride material. The filter member allows hydrogen to flow in or out of the inner container while preventing a leak of the metal hydride material from the inner container.

As described above, the filter member may be provided in the inner container and prevent an outward leak of the metal hydride material while allowing hydrogen to flow in or out of the inner container. Therefore, it is possible to obtain an advantageous effect of stably maintaining the performance of the metal hydride material that compresses the hydrogen.

According to the exemplary embodiment of the present disclosure, the hydrogen compression system may include a cooling unit configured to selectively cool the metal hydride material.

The cooling unit may have various structures capable of selectively cooling the metal hydride material.

For example, the cooling unit may include a cooling tube having a coolant flow path in which a coolant capable of exchanging heat with the inner container circulates. The metal hydride material may be cooled by heat exchange with the inner container.

According to the exemplary embodiment of the present disclosure, the cooling tube may be disposed outside the outer container. According to another embodiment of the present disclosure, the cooling tube may be disposed between the inner container and the outer container.

According to the exemplary embodiment of the present disclosure, the hydrogen compression system may include a controller configured to control power to be applied to the induction heating unit.

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Figure 1:
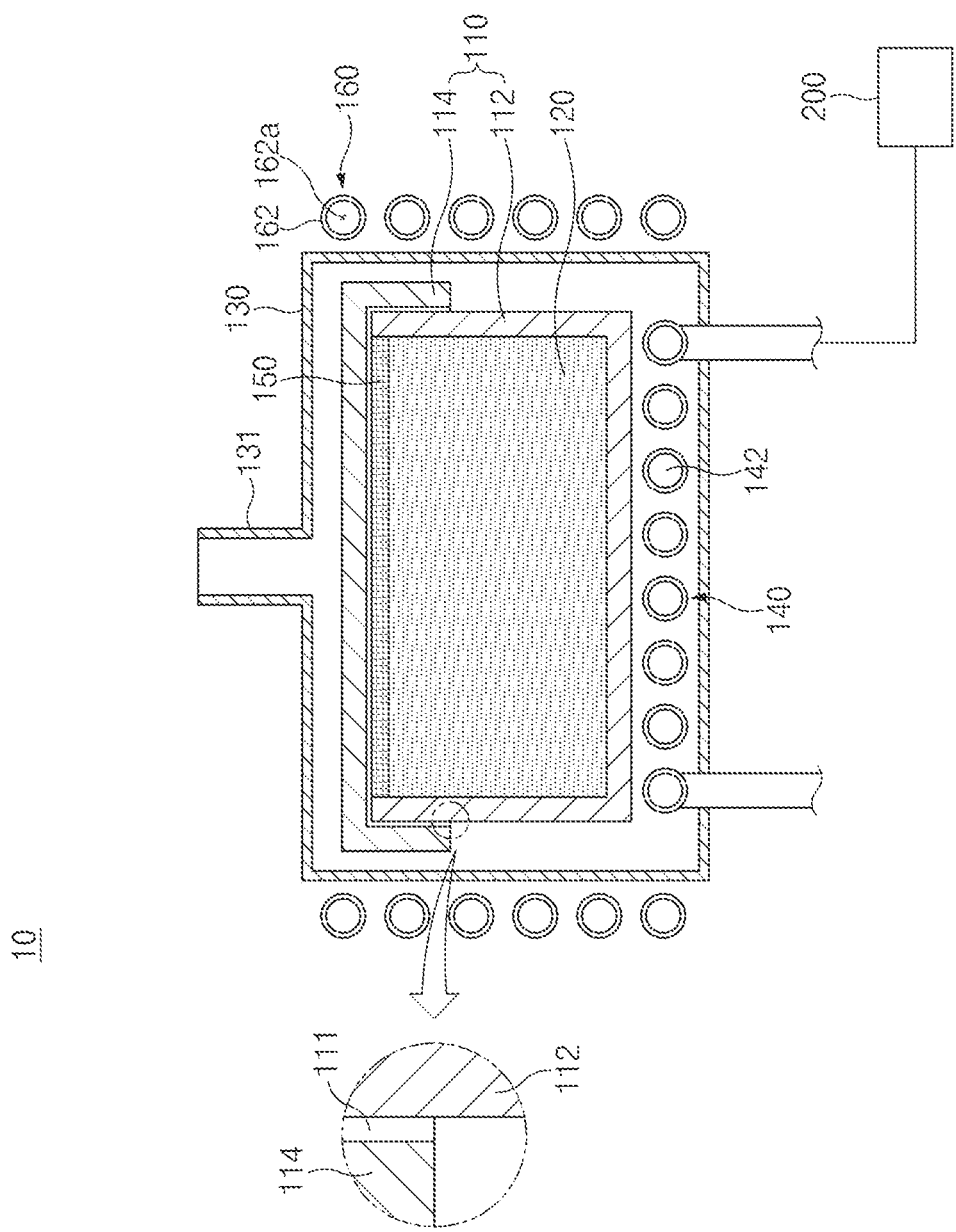
FIG. 1 is a view for explaining a hydrogen compression system according to an embodiment of the present disclosure.
Figure 2:
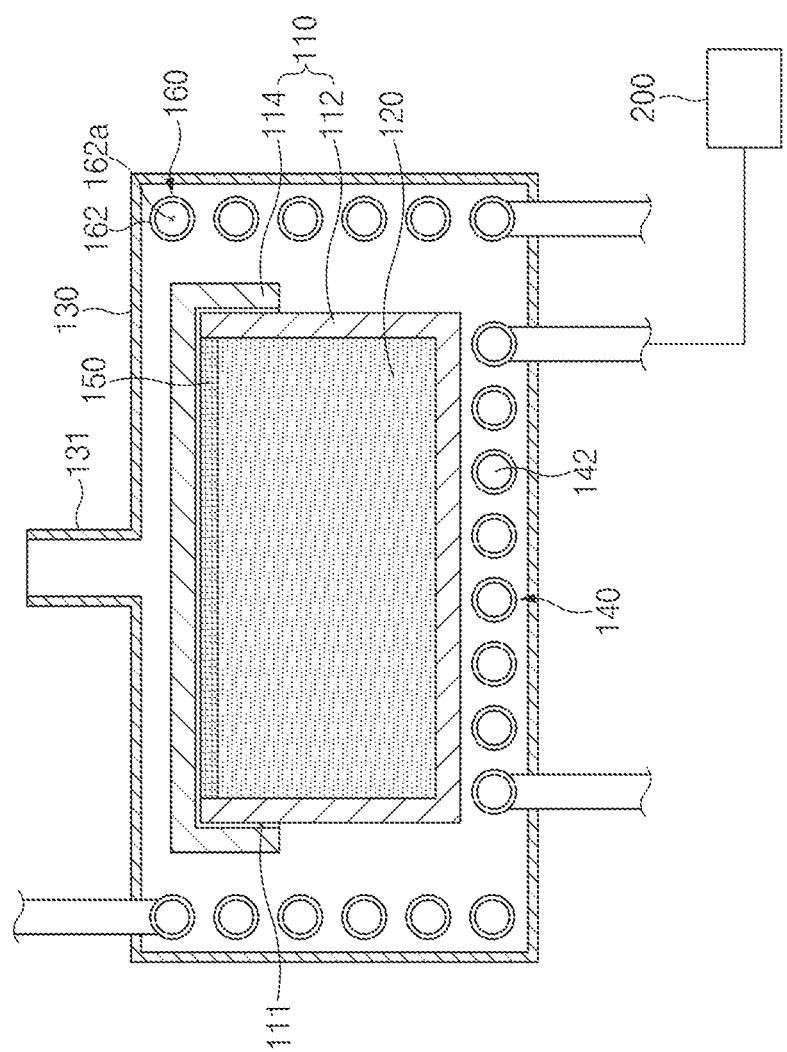
FIG. 2 is a view for explaining a modified example of a cooling unit of the hydrogen compression system according to the embodiment of the present disclosure.
Figure 3:
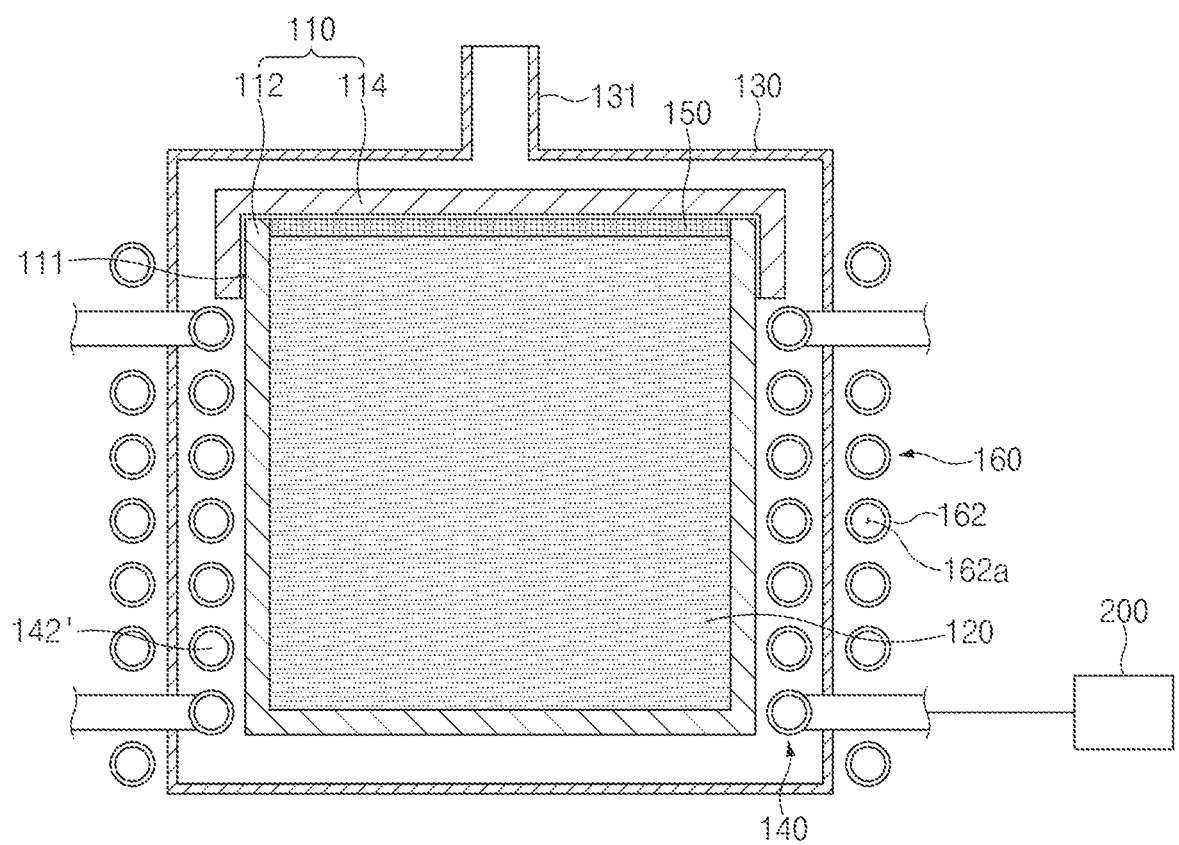
FIG. 3 is a view for explaining a modified example of an induction heating unit of a hydrogen compression system according to another embodiment of the present disclosure.

Referring to FIGS. 1 to 3, a hydrogen compression system 10 according to the embodiment of the present disclosure includes an inner container 110 made of a non-magnetic element and having a hydrogen inlet and outlet (inlet/outlet) portion 111 through which hydrogen flows in or out of the inner container 110, a metal hydride material 120 accommodated in the inner container 110, an outer container 130 configured to surround the inner container 110 and having an inlet/outlet port 131 through which hydrogen flows in or out of the outer container 130, and an induction heating unit 140 disposed between the inner container 110 and the outer container 130 and configured to heat the metal hydride material 120 by induction heating.

For reference, the hydrogen compression system 10 according to the present disclosure may be used to treat (compress) required hydrogen. The present disclosure is not restricted or limited by the characteristics and states of hydrogen treated by the hydrogen compression system 10.

For example, the hydrogen compression system 10 according to the embodiment of the present disclosure may be used to compress hydrogen produced by a steam reforming method before the hydrogen is supplied to a supply destination (e.g., a high-pressure tank). According to another embodiment of the present disclosure, the hydrogen compression system according to the present disclosure may be used to compress again hydrogen that has been compressed once.

The inner container 110 serves to accommodate (store) the metal hydride material 120. The inner container 110 is made of a non-magnetic, non-pressure-resistant material that is not heated by induction heating by the induction heating unit 140 to be described below.

An accommodation space for accommodating the metal hydride material 120 is defined in the inner container 110. The hydrogen inlet/outlet portion 111 is provided at one side of the inner container 110, and hydrogen enters and exits (flows in or out of) the inner container 110 through the hydrogen inlet/outlet portion 111.

The inner container 110 may have various structures having the hydrogen inlet/outlet portion 111 and capable of accommodating the metal hydride material 120. The present disclosure is not restricted or limited by the structure of the inner container 110.

According to the exemplary embodiment of the present disclosure, the inner container 110 may include a container main body 112 having an accommodation space for accommodating the metal hydride material 120, and a container cover 114 configured to cover the accommodation space. The hydrogen inlet/outlet portion 111 may be defined as a gap between the container main body 112 and the container cover 114.

The container main body 112 may be variously changed in shape and structure in accordance with required conditions and design specifications. The present disclosure is not restricted or limited by the shape and structure of the container main body 112.

For example, the container main body 112 may have a cylindrical shape opened at an upper side thereof. The container cover 114 may have a shape corresponding to the container main body 112 and cover the upper opening portion of the container main body 112. The hydrogen inlet/outlet portion 111 through which hydrogen flows in or out of the inner container 110 may be defined as the gap between the container main body 112 and the container cover 114.

According to another embodiment of the present disclosure, the container main body may have a box shape having a polygonal cross-section (e.g., a quadrangular cross-section) or other shapes.

Hereinafter, an example will be described in which the hydrogen inlet/outlet portion 111 is formed along the entire periphery of the container cover 114. According to another embodiment of the present disclosure, the hydrogen inlet/outlet portion may be partially formed only in some sections of the periphery of the container cover.

According to another embodiment of the present disclosure, the inner container may have a circular cross-section or other cross-sectional shapes.

The metal hydride material 120 is accommodated (stored) in the inner container 110 (e.g., the container main body 112) and compresses hydrogen through a process of repeatedly heating and cooling the metal hydride material 120.

Various magnetic elements capable of compressing hydrogen through the repeated heating and cooling processes and being heated by induction heating by the induction heating unit 140 to be described below may be used as the metal hydride material 120. The present disclosure is not restricted or limited by the type and properties of the metal hydride material 120.

For example, the metal hydride material 120 may include at least any one of an AB5-based alloy, an AB2-based alloy, and an AB-based alloy. For example, the metal hydride material 120 may be an alloy containing $LaNi_5$, TiFe, $TiMn_2$, and the like as main elements.

For reference, the metal hydride material 120 may be provided in the form of powder or pellets and accommodated in the inner container 110. The present disclosure is not restricted or limited by the accommodated state and shape of the metal hydride material 120. According to another embodiment of the present disclosure, the metal hydride material may be formed by compressing metal hydride powder or metal hydride pellets and have a bulk shape corresponding to the inner container.

The outer container 130 is provided to surround the entire periphery of the inner container 110. The inlet/outlet port 131 through which hydrogen flows in or out of the outer container 130 is provided on at least any one side of the outer container 130.

The outer container 130 may have various structures capable of surrounding the inner container 110. The present disclosure is not restricted or limited by the structure and shape of the outer container 130.

For example, the outer container 130 may have a quadrangular box shape capable of accommodating the inner container 110 therein. Alternatively, the outer container 130 may have a circular cross-sectional shape or other cross-sectional shapes.

The inlet/outlet port 131 through which hydrogen flows in or out of the outer container 130 may be provided at one side (e.g., an upper end) of the outer container 130. The hydrogen supplied into the outer container 130 through the inlet/outlet port 131 may flow into the inner container 110 through the hydrogen inlet/outlet portion 111.

On the contrary, the hydrogen compressed in the inner container 110 may be discharged to the outside of the inner container 110 (to the space between the inner container 110 and the outer container 130) through the hydrogen inlet/outlet portion 111 and then supplied to the supply destination via the inlet/outlet port 131.

The induction heating unit 140 is disposed between the inner container 110 and the outer container 130 and heats the metal hydride material 120 by induction heating.

Various induction heating elements capable of heating the metal hydride material 120 by induction heating may be used as the induction heating unit 140. The present disclosure is not restricted or limited by the type and structure of the induction heating unit 140.

According to the exemplary embodiment of the present disclosure, the induction heating unit 140 may include an induction heating coil 142 configured to apply an induced magnetic field to the metal hydride material 120.

More specifically, when power is applied to the induction heating coil 142 and alternating current flows through the induction heating coil 142, the magnetic field of the induction heating coil 142 is changed, such that the metal hydride material 120 may be autonomously heated by a hysteresis loss and an eddy current loss created in the metal hydride material 120. In this case, a heating temperature of the metal hydride material 120 may be selectively adjusted by adjusting intensity or frequency of (adjusting a magnitude of a frequency of) current to be applied to the induction heating coil 142.

The induction heating coil 142 may have various structures in accordance with required conditions and design specifications. The present disclosure is not restricted or limited by the structure and shape of the induction heating coil 142.

For example, referring to FIG. 1, the induction heating coil 142 may be disposed between the inner container 110 and the outer container 130 and have a plate shape corresponding to a bottom surface of the inner container 110.

The induction heating coil 142 may be disposed in a straight or curved shape so as to have the plate shape corresponding to the bottom surface of the inner container 110. The present disclosure is not restricted or limited by the arrangement shape of the induction heating coil 142.

As another example, referring to FIG. 3, an induction heating coil 142' may have a helical (spiral) shape that surrounds the lateral periphery of the inner container 110.

According to another embodiment of the present disclosure, a part of the induction heating coil may be formed to correspond to the bottom surface of the inner container, and another part of the induction heating coil may be formed to surround the lateral periphery of the inner container.

For reference, power may be supplied to the induction heating coil 142 or 142' through a typical power supply line or from a battery.

As described above, according to the embodiment of the present disclosure, the induction heating unit 140 is disposed between the inner container 110 and the outer container 130, and the metal hydride material 120 is heated by induction heating by the induction heating unit 140. Therefore, it is possible to quickly heat the metal hydride material 120 to an accurate temperature.

Among other things, according to the embodiment of the present disclosure, the metal hydride material 120 is not indirectly heated (e.g., heated by thermal conduction), but the metal hydride material 120 itself is directly heated (by induction heating). Therefore, it is possible to obtain an advantageous effect of shortening the time required to heat the metal hydride material 120 and entirely heating the metal hydride material 120 at a uniform temperature.

Moreover, according to the embodiment of the present disclosure, the metal hydride material 120 is heated by heat generated directly from the metal hydride material 120 itself. Therefore, it is possible to obtain an advantageous effect of remarkably shortening the time required to heat the metal hydride material 120 and minimizing the temperature deviation of the metal hydride material 120 in comparison with the configuration in which the inner container 110 configured to accommodate the metal hydride material 120 is heated (by thermal conduction).

In addition, according to the embodiment of the present disclosure, the inner container 110 is not directly heated, but the metal hydride material 120 accommodated in the inner container 110 is heated by induction heating. Therefore, it is possible to obtain an advantageous effect of minimizing degradation of the inner container 110 and improving the durability and stability.

In addition, according to the embodiment of the present disclosure, the inner container 110 configured to accommodate the metal hydride material 120 is made of a non-magnetic element, and thus a decrease in intensity of the induced magnetic field caused by the inner container 110 may be minimized. Therefore, it is possible to obtain an advantageous effect of stably ensuring induction heating performance of the metal hydride material 120 and further shortening the time required to heat the metal hydride material 120.

According to the exemplary embodiment of the present disclosure, the hydrogen compression system 10 may include a filter member 150 disposed in the inner container 110 and configured to cover the metal hydride material 120. The filter member 150 allows hydrogen to flow in or out of the inner container 110 while preventing a leak of the metal hydride material 120 from the inner container 110.

Various filters or various porous members capable of preventing an outward leak of the metal hydride material 120 accommodated in the inner container 110 while allowing hydrogen to flow in or out of the inner container 110 may be used as the filter member 150. The present disclosure is not restricted or limited by the type and structure of the filter member 150.

For example, a porous member made of a stainless material may be used as the filter member 150. In particular, the pore of the filter member 150 may have a smaller size than the particle of the metal hydride material 120.

As described above, the filter member 150 may be provided in the inner container 110 and prevent an outward leak of the metal hydride material 120 while allowing hydrogen to flow in or out of the inner container 110. Therefore, it is possible to obtain an advantageous effect of stably maintaining the performance of the metal hydride material 120 that compresses the hydrogen.

According to the exemplary embodiment of the present disclosure, the hydrogen compression system 10 includes a cooling unit 160 configured to selectively cool the metal hydride material 120.

As described above, the metal hydride material 120 may compress hydrogen through the repeated heating and cooling processes, and the cooling unit 160 may serve to cool the metal hydride material 120.

The cooling unit 160 may have various structures capable of selectively cooling the metal hydride material 120. The present disclosure is not restricted or limited by the structure of the cooling unit 160 and the cooling method.

For example, the cooling unit 160 may include a cooling tube 162 having a coolant flow path 162a in which a coolant capable of exchanging heat with the inner container 110 circulates. The metal hydride material 120 may be cooled by heat exchange with the inner container 110.

Referring to FIG. 1, according to the exemplary embodiment of the present disclosure, the cooling tube 162 may be disposed outside the outer container 130. For example, the cooling tube may have a helical (spiral) shape and surround the lateral periphery of the outer container 130. Alternatively, the cooling tube may be disposed on the bottom surface, the upper surface, or other portions of the outer container 130.

The outer container 130 may be cooled by the heat exchange with the coolant circulating along the cooling tube. The metal hydride material 120 may be cooled as the inner container 110 is cooled by the heat exchange between hydrogen (hydrogen in the outer container 130) and the outer container 130 cooled by the coolant.

Referring to FIG. 2, according to another embodiment of the present disclosure, a cooling tube 162 may be disposed between the inner container 110 and the outer container 130. For example, the cooling tube 162 may be disposed between the inner container 110 and the outer container 130 and surround the lateral periphery of the inner container 110. Alternatively, the cooling tube may be disposed between the outer container and the upper surface (or the bottom surface) of the inner container.

The inner container 110 may be cooled by the heat exchange with the coolant circulating along the cooling tube. The metal hydride material 120 may be cooled as the inner container 110 is cooled by the coolant.

In the embodiment of the present disclosure illustrated and described above, the example has been described in which the metal hydride element is cooled by the coolant-cooled cooling structure using the cooling tube 162. However, according to another embodiment of the present disclosure, the cooling unit may be configured by a Peltier element or other cooling means.

According to the exemplary embodiment of the present disclosure, the hydrogen compression system 10 may include a controller 200 configured to control power to be applied to the induction heating unit 140.

The controller 200 may control power to be applied to the induction heating unit 140 (e.g., the induction heating coil 142) depending on whether hydrogen is stored in the metal hydride material 120 or whether hydrogen is discharged.

For example, when hydrogen is stored in the metal hydride material 120, the controller 200 may cut off the supply of power to the induction heating unit 140, and the coolant may circulate along the cooling tube 162.

In contrast, when hydrogen is discharged from the metal hydride material 120, the controller 200 may apply power to the induction heating unit 140 and generate the induced magnetic field in the metal hydride material 120, thereby heating the metal hydride material 120.

For reference, the intensity and frequency of the induced magnetic field, which is applied to the metal hydride material 120 when power is applied to the induction heating unit 140, may be determined depending on the type and properties of the metal hydride material 120.

The controller 200 may be a central processing unit (CPU) or a semiconductor device that processes instructions stored in a memory and/or a storage. Examples of the memory and the storage may include various types of volatile or non-volatile storage media. Examples of the memory may include a read only memory (ROM) and a random-access memory (RAM).

According to the embodiment of the present disclosure described above, it is possible to obtain an advantageous effect of quickly heating the metal hydride material to an accurate temperature to compress hydrogen.

In particular, according to the embodiment of the present disclosure, it is possible to quickly and accurately heat the metal hydride material without providing a separate heat source for heating the metal hydride material.

In addition, according to the embodiment of the present disclosure, it is possible to obtain an advantageous effect of improving performance in compressing hydrogen and shortening the time required for the process of compressing hydrogen.

In addition, according to the embodiment of the present disclosure, it is possible to obtain an advantageous effect of inhibiting damage to and breakage of the inner container and improving the durability and safety.

In addition, according to the embodiment of the present disclosure, it is possible to obtain an advantageous effect of minimizing electric power consumption and improving energy efficiency.

In addition, according to the embodiment of the present disclosure, it is possible to obtain an advantageous effect of simplifying the structure and improving the degree of design freedom and spatial utilization.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

The invention claimed is:

1. A hydrogen compression system comprising:
   an inner container made of a non-magnetic element and having a hydrogen inlet and outlet portion through which hydrogen flows in or out of the inner container;
   a metal hydride material positioned in the inner container;
   an outer container surrounding the inner container, the outer container having an inlet and outlet port through which hydrogen flows in or out of the outer container; and
   an induction heating unit positioned between the inner container and the outer container, the induction heating unit being configured to heat the metal hydride material by induction heating;
   wherein the inner container comprises:
      a container main body having an accommodation space configured to accommodate the metal hydride material; and
      a container cover configured to cover the accommodation space; and
   wherein the hydrogen inlet and outlet portion is defined as a gap between the container main body and the container cover.

2. The hydrogen compression system of claim 1, further comprising:
   a filter member positioned in the inner container, the filter member being configured to cover the metal hydride material, and to prevent a leak of the metal hydride material from the inner container while allowing hydrogen to flow in or out of the inner container.

3. The hydrogen compression system of claim 1, wherein the induction heating unit comprises an induction heating coil configured to apply an induced magnetic field to the metal hydride material.

4. The hydrogen compression system of claim 3, wherein the induction heating coil is positioned between the inner container and the outer container, and wherein the induction heating coil corresponds to a bottom surface of the inner container.

5. The hydrogen compression system of claim 3, wherein the induction heating coil has a helical shape and surrounds a lateral periphery of the inner container.

6. The hydrogen compression system of claim 1, further comprising:
   a cooling unit configured to cool the metal hydride material.

7. The hydrogen compression system of claim 6, wherein the cooling unit comprises a cooling tube having a coolant flow path in which a coolant capable of exchanging heat with the inner container circulates, and
   wherein the metal hydride material is cooled by heat exchange with the inner container.

8. The hydrogen compression system of claim 7, wherein the cooling tube is positioned outside the outer container.

9. The hydrogen compression system of claim 7, wherein the cooling tube is positioned between the inner container and the outer container.

10. The hydrogen compression system of claim 1, wherein the metal hydride material comprises at least any one of an AB5-based alloy, an AB2-based alloy, and an AB-based alloy.

11. The hydrogen compression system of claim 1, further comprising:
    a controller configured to apply power to the induction heating unit.

* * * * *